US005808267A

United States Patent [19]

Eckhoff et al.

[11] Patent Number: 5,808,267

[45] Date of Patent: Sep. 15, 1998

[54] PLASMA GUN WITH GAS DISTRIBUTION PLUG

[76] Inventors: Paul S. Eckhoff, 7580 County Rd. 25, Stockport, N.Y. 12173; George Farrall, 51 Bluff Rd., Rexford, N.Y. 12148

[21] Appl. No.: 629,239

[22] Filed: Apr. 8, 1996

Related U.S. Application Data

[62] Division of Ser. No. 370,392, Jan. 9, 1995, abandoned.

[51] Int. Cl.[6] .................................................. B23K 10/00

[52] U.S. Cl. ............................... 219/121.51; 219/121.48; 219/75

[58] Field of Search ............................ 219/121.51, 121.5, 219/121.48, 121.36, 74, 75, 121.55

[56] References Cited

U.S. PATENT DOCUMENTS

| | | | |
|---|---|---|---|
| 3,830,950 | 8/1974 | Schoumaker et al. . | |
| 3,938,450 | 2/1976 | Jaronko et al. . | |
| 4,220,843 | 9/1980 | Borer et al. . | |
| 4,688,494 | 8/1987 | Domnitch . | |
| 4,713,826 | 12/1987 | Bebber et al. . | |
| 4,738,702 | 4/1988 | Yigdall et al. . | |
| 4,777,343 | 10/1988 | Goodwin | 219/121.51 |
| 4,907,409 | 3/1990 | Simon et al. | 60/203.1 |
| 4,918,282 | 4/1990 | Cheek . | |
| 5,105,061 | 4/1992 | Blankenship | 219/121.52 |
| 5,107,092 | 4/1992 | Masden et al. | 219/121.39 |
| 5,237,938 | 8/1993 | Fujimori et al. . | |
| 5,245,627 | 9/1993 | Drouet . | |
| 5,408,494 | 4/1995 | Schlienger . | |
| 5,415,113 | 5/1995 | Wheeler et al. . | |
| 5,451,739 | 9/1995 | Nenchinsky et al. | 219/121.51 |

*Primary Examiner*—Mark H. Paschall
*Attorney, Agent, or Firm*—Galgano & Burke

[57] ABSTRACT

A novel plasma gun having a gas distribution plug which enhances the circumferential velocity component of the plasma gas. The gas distribution plug has a bore with a greater circumferential component proximate the gas egress end then at the gas ingress end.

4 Claims, 2 Drawing Sheets

PLASMA GUN WITH GAS DISTRIBUTION PLUG

This application is a divisional of U.S. patent application Ser. No. 08/370,392, filed Jan. 9, 1995 now abandoned.

The present invention is directed to a plasma gun particularly suited for pyrolysis of waste material.

BACKGROUND OF THE INVENTION

The disposal of hazardous waste is a problem of global proportions. Many solutions have been proposed for treating such wastes including incineration in rotary kilns. Due to the chemical nature of many materials, incineration is not a preferred manner of disposal since flue gases resulting from incineration may be particularly harmful to the environment. It would therefore be desirable to provide a process for the disposal of waste materials which does not have the same adverse impact on the environment as incineration.

Experiments have been conducted and reported in the literature wherein solid waste is treated with high power plasma arcs in a batch process. Since contaminated waste is often found in remote areas far from incineration plants and disposal sites, it is often necessary to load the waste material into train cars and/or trucks for transporting to a waste disposal/treatment site. The handling and shipping of hazardous materials is very expensive and, in some instances, objectionable. It would therefore be desirable to provide a method and apparatus for disposing of waste at a waste site which would not require the expensive handling and transporting of the waste material.

Those skilled in the art will appreciate that a plasma gun is an electrical device for reshaping a more or less conventional arc into a flame much like that of a blowtorch, but at very high electrical power. Levels of several megaWatts are not uncommon in metallurgical applications. Typically, plasma guns are used in applications where concentrated heat sources are required.

The shape of a conventional high power arc in a gaseous medium such as air, nitrogen, or $CO_2$ is approximately columnar and axisymmetric as it exists between rod or button shaped electrodes (anode and cathode) which oppose each other by some specified distance. This distance typically ranges from a fraction of an inch to a foot or more. In a plasma gun, the electrode arrangement is often a rod shaped cathode lying coaxially within an anode which is in the shape of a hollow cylinder.

Given no other constraints, the arc established between anode and cathode forms a column extending between the cathode and anode surfaces across what is essentially the shortest line-of-sight distance. To form a "flame" extending out of a nozzle and beyond the anode, it is the usual practice to blow gas having a strong axial velocity component into the space between the anode and cathode. The gas serves to greatly distort the arc "column" into a "U" shape which is still attached to the anode and cathode surfaces at the two points of the "U". The bulk of the "U" shape therefore extends beyond the nozzle, forming a "torch" flame. While an axial gas flow serves to produce the desired shape, the root points of the arc at the anode and cathode surfaces tend to remain stationary. Since these "footprints" are highly contracted at their point of attachment, the power density at the electrode surfaces typically exceeds a megaWatt per square centimeter—even for arcs that are relatively low in total power, such as 1 kWatt. Such high power densities cause the root points to melt and vaporize, severely limiting the useful life of the electrodes.

To reduce the erosion losses at the electrodes and thereby extend their useful life, an arc is preferably continuously moved in a circular path on the electrode surfaces. One method for accomplishing this is to impart a circumferential velocity component of velocity to the gas used to blow the discharge into a flame shape. Usually this is done by injecting the gas through a tube with their axes perpendicular to the axis of symmetry of the gun at the largest possible radius in the radial space between the anode and cathode. The flow is thus tangent to the inner circumference of the coaxial anode, producing a swirl or "vortex" in the gas stream. Since the arc actually "exists" in the ionized gas so introduced, this technique tends to cause an otherwise stationary arc to move, not only in the column itself, but also at the attachment of the arc to the anode and cathode. Another conventional method for producing arc rotation is the application of a magnetic field in an appropriate configuration.

Since the anodes and cathodes of plasma guns have relatively short life spans, it would also be desirable to provide a plasma gun which extends the useful life of the anode and/or cathode. These and other advantages are achieved by embodiments of the present invention which are described below.

In the anticipated application of a plasma gun of the present invention, plasma torches may be required to operate for long periods of time at high power without failure. In a rotary kiln of the size proposed, thermal insulation using hard, refractory materials is required. Such materials require long periods of gradual temperature change in bringing the system to appropriate operating temperatures or shutting down the system after completion of a working session. Such insulation materials are glass-like in their thermal properties. Typically, warmup and cooldown periods of two or more days are required if destruction of the insulation is to be avoided due to thermal stresses. The chosen torch designs generally must be capable of operating at power levels up to 250 kiloWatts with attendant long electrode life for many of the applications addressed by the subject patent application.

DETAILED DESCRIPTION

Figure 1:
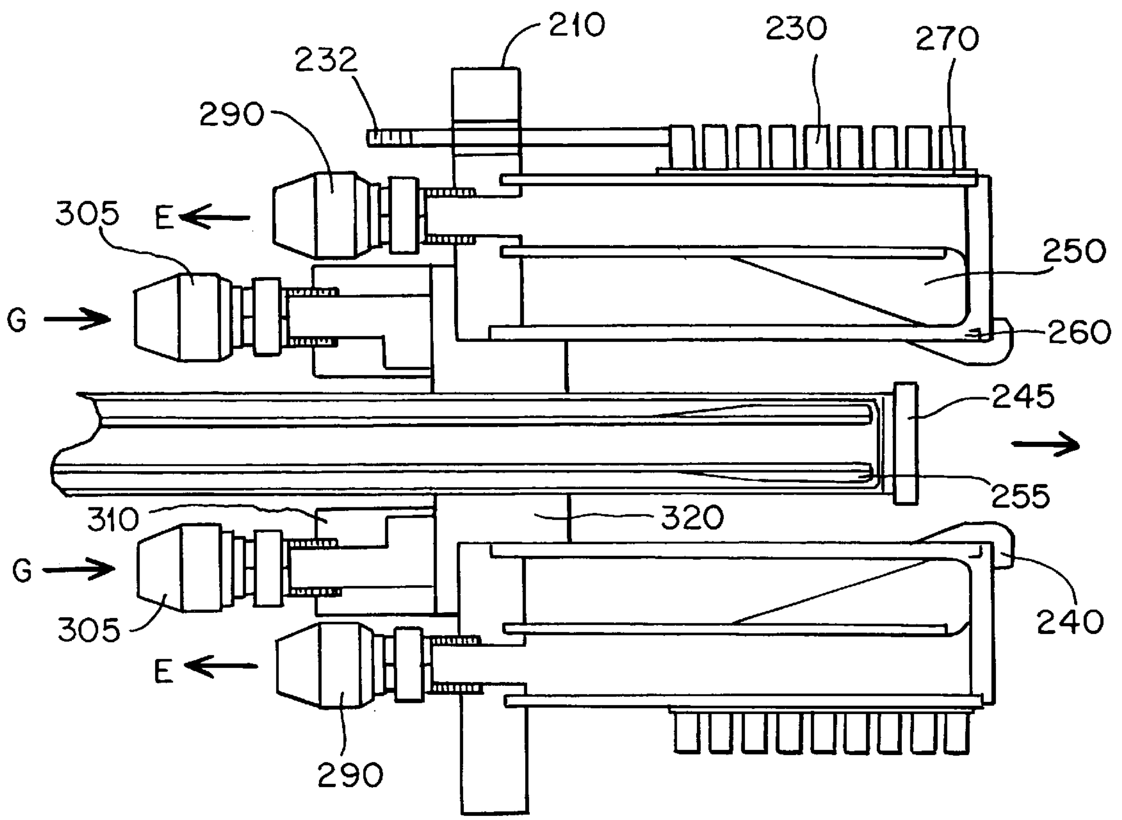
FIG. 1 is a cross-sectional view illustrating the water inlets of a plasma gun of one embodiment of the present invention.

One aspect of the present invention comprises a novel plasma gun, including a novel gas distribution plug. With reference to FIG. 1, which is an illustration of one embodiment of a novel plasma gun of the present invention, the plasma gun comprises an insulated circular plate holder 210. The illustrated plasma gun also comprises a magnetic coil 230 extending around the outer shell 270 of a first anode.

Figure 2:
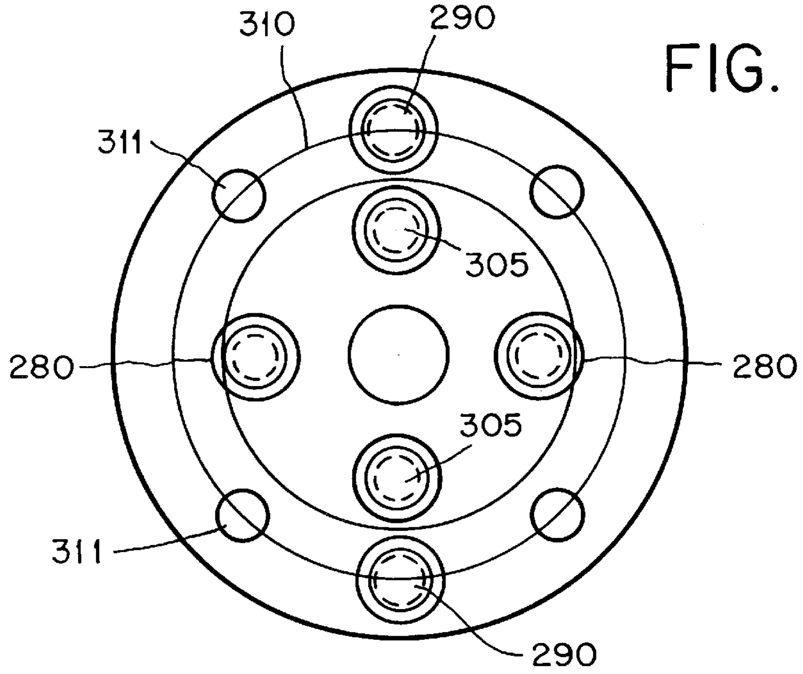
FIG. 2 is a rear, end view of one embodiment of a gas distribution plug of the present invention.
Figure 3:
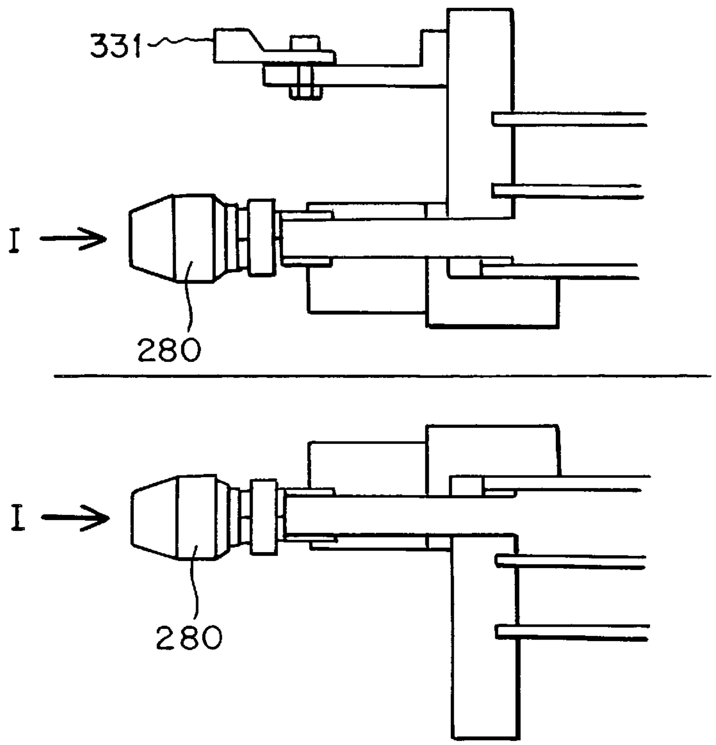
FIG. 3 is a cross-sectional view along a generally perpendicular plain to cross-sectional view of FIG. 1.

This first anode is generally in the form of a hollow, annular ring in order to allow cooling water to enter inlets 280 (See FIGS. 2 and 3) in the direction of arrows I and to exit water outlets 290 in the direction of arrows E. Since the distal portions of the inner shell 260 of the first anode will generally sustain the greatest amount of electrical activity, the end of this anode is provided with a protective cap 240, preferably formed of a heat resistant material such as copper. Additionally, the internal surface of this portion of the first anode is provided with water deflectors 250 in order to increase the velocity of cooling water proximate the inner tip of the first anode. In a similar fashion, the distal portion of the cathode is provided with a protective cap 245 preferably formed of a heat resistive material such as thoriated tungsten, and the inner surfaces of the cathode tip are provided with water deflectors 255 in order to increase the velocity of cooling water at the cathode tip. Cooling water is supplied to the cathode via an inlet and exits through an outlet.

The electrodes of the present invention are also preferably formed of materials which will maximize their electrical efficiency, thermal stability and durability. The first anode and the cathode body in the plasma gun are preferably formed of copper tubing while the cathode tip is preferably formed of a thoriated tungsten. Thoriated tungsten as the cathode material is preferred because the thoria added to tungsten provides a surface with low work function, while the tungsten base is tolerant of high temperatures. These two qualities provide sufficient electron emission from the cathode to carry the high currents that are demanded of the arc. While pure tungsten might be operated to give similar currents, the low work function imparted to the surface by the thoria allows the cathode to be operated at somewhat lower temperatures, allowing for a significantly longer cathode life. As noted above, the first anode is made from copper to take advantage of its high thermal conductivity to carry heat from the electrode surface to the flow of cooling water.

Figure 5:
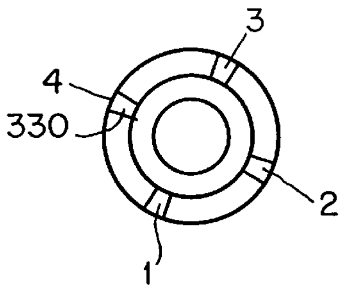
FIGS. 5 and 6 are cross-sectional views taken at proximal and distal ends, respectively, of a gas distribution plug of the present invention.
Figure 4:
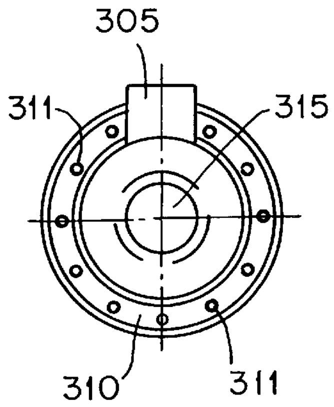
FIG. 4 is an end view of a gas distribution plug of the present invention.
Figure 6:
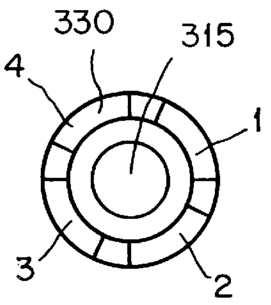

As shown in FIG. 1, plasma gas is supplied to the space between the cathode and anode through gas distribution plug 320 through gas inlet 305 in the general direction of arrow G. The details of gas distribution plug 320 are more clearly illustrated in FIGS. 4–7. The gas distribution plug comprises a bolt ring 310 (FIG. 4) adapted for connecting the distribution plug 320 to the plasma gun via bolts 311 (FIG. 4). The distribution plug 320 is generally annular shaped having an axial opening 315 (FIGS. 4 and 6) which receives the cathode. The portion of the distribution plug 320 adjacent the cathode is preferably formed of a material such as Teflon in order to serve as a solid insulator. The outer surface of the distribution plug 320 also comprises a number of bores 330 which extend from the proximal end toward the distal end of the plug (to the right in FIG. 7). The bores 330 are shaped to extend essentially longitudinally at the proximal end of the plug, i.e., closest to the gas inlet 305 (FIG. 4), and then to angle circumferentially. In this manner, the gas exiting the distribution plug 320 is provided with a strong circumferential velocity component. The change in angle of bores 330 is best illustrated in the "unrolled" view of FIG. 7. FIG. 5 is a cross-sectional view of the plug proximate the proximal end. For purposes of illustration, bores 330 are labeled "1, 2, 3 and 4" and extend in the same direction as the central axis at the proximal end of the distribution plug 320 (the left side in FIG. 7). At the distal end of the distribution plug 320, the circumferential angling of bores 330 results in a positional shift and a wider egress opening as depicted in FIG. 6.

Figure 7:
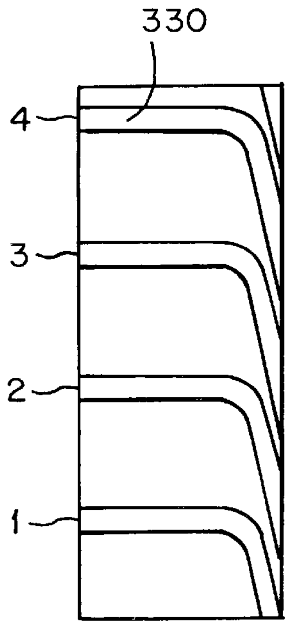
FIG. 7 is an "unrolled" top view of the portions of the gas distribution plug shown in FIGS. 5 and 6.

The illustrated embodiment is merely provided for purposes of example. From the present description and drawings, it will be appreciated that the angle of bores 330 and therefore the circumferential velocity component of the gas exiting the gas distribution plug 320 can be adjusted as desired. For example, the bores need not be constructed and angled exactly as shown in FIG. 7. The number and size of the bores 330 can be varied according to the needs of a particular plasma gun. It is most preferable to provide a gas distribution which is uniform in both volume and velocity. The distal portion of the gas distribution plug 320 is also preferably formed of insulating material in order to shield the conduits which carry gas to the gas distribution plug from the high heats of the plasma arc. Suitable electrical connections for providing electricity and/or grounding portions of the gun, such as terminal 331 and connector 332 can be provided.

What is claimed:

1. A plasma gun comprising:

an anode;

a cathode disposed in spaced relation to said anode; and at least one gas distribution plug comprising at least one bore having an ingress end for receiving gas and an egress end proximate a space between said anode and said cathode, wherein said egress end is spaced in an axial direction from said ingress end, and a portion of said bore extends axially and circumferentially proximate said egress end so that gas exiting said distribution plug is provided with a circumferential velocity component around said at least one of said anode and said cathode.

2. A plasma gun according to claim 1 wherein said bore extends substantially axially proximate said ingress end.

3. A plasma gun according to claim 2 wherein said bore extends more circumferentially than axially proximate said egress end.

4. A plasma gun according to claim 1 wherein said bore extends more circumferentially than axially proximate said egress end.

* * * * *